United States Patent [19]

Watanabe et al.

[11] Patent Number: 4,933,107

[45] Date of Patent: Jun. 12, 1990

[54] EASILY PEELABLE SEMICONDUCTIVE RESIN COMPOSITION

[75] Inventors: Kiyoshi Watanabe; Takanori Yamazaki; Hideki Yagyu, all of Hitachi, Japan

[73] Assignee: Hitachi Cable Ltd., Tokyo, Japan

[21] Appl. No.: 251,415

[22] Filed: Sep. 30, 1988

[30] Foreign Application Priority Data

Mar. 29, 1988 [JP] Japan .................................. 63-75743

[51] Int. Cl.$^5$ .............................................. H01B 1/06
[52] U.S. Cl. .................................... 252/511; 252/502; 252/510; 524/488; 524/495; 524/496
[58] Field of Search ......................... 252/511, 502, 510; 524/496, 487, 488

[56] References Cited

U.S. PATENT DOCUMENTS 4,226,823 10/1980 Jansson et al. .
4,374,227 2/1983 Michie .
4,399,060 8/1983 Glass .................................... 252/511
4,412,938 11/1983 Kakizaki et al. .................... 252/511
4,612,139 9/1986 Kawasaki et al. .................. 252/511

FOREIGN PATENT DOCUMENTS 2722801 12/1977 Fed. Rep. of Germany .
1574796 9/1980 United Kingdom .

*Primary Examiner*—Josephine Barr
*Attorney, Agent, or Firm*—Sughrue, Mion, Zinn, Macpeak & Seas

[57] ABSTRACT

An easily peelable semiconductive resin composition comprising 100 parts by weight of ethylene-vinyl acetate copolymer-based component, 1 to 20 parts by weight of waxy aliphatic hydrocarbon, and 50 parts by weight or more of furnace carbon black having an arithmetic means particle size of 25 to 40 m$\mu$, iodine adsorption of 4 to 60 mg/g, and DBP oil absorption (by JIS A method) of 120 to 150 ml/100 g.

16 Claims, No Drawings

EASILY PEELABLE SEMICONDUCTIVE RESIN COMPOSITION

FIELD OF THE INVENTION

This invention relates to a semiconductive resin composition suitably used for the formation of the external semiconductive layer of the plastic-insulated electric power cables, especially to an easily peelable semiconductive resin composition which can form an external semiconductive layer improved in both adhesion to and peeling from the crosslinked polyethylene insulator.

BACKGROUND OF THE INVENTION

Generally, the external semiconductive layer of the plastic-insulated electric cables, particularly of those insulated with a crosslinked polyethylene, is formed by extrusion. It is necessary for the external semiconductive layer to tightly adhere to the crosslinked polyethylene insulator in order to avoid generation of corona discharge. There is also a demand, on the other hand, that the external semiconductive layer should be easily removed in the case of terminal treatment of the cable without giving any damage to the insulator. Accordingly, there is a demand for an external semiconductive layer which efficiently adheres in the normal state but which is easily peeled in the case of need.

Such a semiconductive layer can be obtained by using, as a base material, a polymer having no affinity with the crosslinked polyethylene insulator. Conventionally used base material is an ethylene-vinyl acetate copolymer.

To attain satisfactory peeling properties, however, those with high vinyl acetate concentration (e.g., with 45 % by weight or higher) or a vinyl chloridegrafted copolymer should be used. Such semiconductive layers result in poor thermal resistance and mechanical strength, and also, a satisfactory extrusion workability was not obtained.

SUMMARY OF THE INVENTION

The present invention have been made to solve the aforesaid problems. Thus it is an object of the present invention to provide an easily peelable semiconductive resin composition with improved peeling property, thermal resistance, and mechanical properties, as well as excellent extrusion workability.

The semiconductive resin composition of the present invention comprises 100 parts by weight of ethylene-vinyl acetate copolymer-based polymer component, 1 to 20 parts by weight of waxy aliphatic hydrocarbon, and 50 parts by weight or more of furnace carbon black having an arithmetic mean particle size of 25 to 40 m$\mu$, iodine absorption of 40 to 60 mg/g, and DBP oil absorption (by JIS A method) of 120 to 150 ml/100g.

The polymer component in the present invention may be the ethylene vinyl acetate copolymer alone or a combination thereof with another polymer.

The ethylene-vinyl acetate copolymer as the base polymer is not particularly limited, however, it is preferable that the vinyl acetate content is in the range of 20 to 55% by weight. When the content is less than 20% by weight, a satisfactory peeling property is not achieved, and when the content exceeds 55% by weight, the mechanical strength of the semiconductive layer tends to decrease.

One of the preferable polymer components in the present invention is the blend of the ethylene-vinyl acetate copolymer and an aromatic vinyl monomer-modified ethylene-vinyl acetate copolymer. This polymer component may further improve the peeling property.

The aromatic vinyl monomer-modified ethylene-vinyl acetate copolymer to be used in the present invention is a copolymer obtained by graft-copolymerization of aromatic vinyl monomers such as styrene, methyl styrene, and methyl styrene, to an ethylene-vinyl acetate copolymer containing 20% by weight or more of vinyl acetate.

The content of the aromatic vinyl monomer to be incorporated into the aromatic vinyl monomer-modified ethylene-vinyl acetate copolymer is preferably from 5 to 60% by weight. Further, the polymer component should desirably contain 95 to 50% by weight of ethylene-vinyl acetate copolymer and 5 to 50% by weight of aromatic vinyl monomer-modified ethylene-vinyl acetate copolymer. The aromatic vinyl monomer-modified ethylene-vinyl acetate copolymer of less than 5% by weight has little contribution to the peeling property, and that of more than 50% by weight decreases the mechanical strength of the semiconductive layer.

A chief feature of the present invention resides in that a waxy aliphatic hydrocarbon and a special furnace carbon black having an arithmetic mean particle size of 25 to 40 m$\mu$, an iodine adsorption of 40 to 60 mg/g, a DBP oil absorption (by JIS A method) of 120 to 150 ml/100 g, are used together. This gives a synergetic effect resulting in an improved peeling property and an improved extrusion workability due to the lowered viscosity.

Examples of waxy aliphatic hydrocarbons include paraffine wax, microcrystalline wax, and petrolatum, all of which normally have a molecular weight of 1,000 or less.

The amount of the waxy aliphatic hydrocarbon to be incorporated is restricted to 1 to 20 parts by weight per 100 parts by weight of the polymer component, wherein a content of less than 1 part by weight is insufficient to improve peeling properties and extrusion workability, whereas a content exceeding 20 parts by weight damages thermal resistance.

The arithmetic mean particle size of the special furnace carbon black in the present invention is obtained by electron microscopic method. When particles smaller than 25 m$\mu$ are used, extrusion workability is damaged by increasing viscosity. When particles exceeding 40 m$\mu$ are used, sufficient conductivity cannot be obtained.

An iodine adsorption of less than 40 mg/g gives insufficient conductivity and that in excess of 60 mg/g increases the viscosity of the composite and deteriorates the extrusion workability.

DBP oil absorption is measured by JIS A method. When it is lower than 120 ml/100 g, conductivity obtained is not high enough, and a value higher than 150 ml/100 g increases the viscosity of the composition and adversely affects the extrusion workability.

The special furnace carbon black should be added in an amount of 50 parts by weight or more per 100 parts by weight of the polymer component. If the amount is less than this limit, no satisfactory conductivity is obtained.

Acetylene black may be used together with the above special furnace carbon black so far as the viscosity of the composition is not increased to a large extent.

Lubricants and antioxidants may be added in addition to the aforesaid components. Aliphatic alcohols, fatty acids, esters of fatty acids, metal salts of fatty acids, fatty acid amides, and the like are the examples of the lubricants. Those may be used singly or in combinations of two or more thereof.

Specific antioxidants include thiobisphenols, alkylidenebisphenols, alkylphenols, hydroxybenzyl compounds, aminophenols, hydroxyphenylpropionates, secondary aromatic amines, thioethers, phosphites, phosphonites, etc. These may be used independently or in combinations of two or more.

The composition of the present invention may be crosslinked. Organic peroxides are generally used for a crosslinking agent in the present case. Dicumyl peroxides, 1,3-bis(tert-butylperoxyisopropyl)benzene, 2,2-dimethyl-2,5-di(tert-butylperoxy)hexine-3 are specific examples for dialkyl peroxides suitable for use as the crosslinking agent.

The present invention is now illustrated in greater detail with reference to nonlimiting Examples and Comparative Examples. In these examples, all percents and parts are by weight unless otherwise indicated.

EXAMPLES

The indicated components were kneaded with a Bambury mixer to give the compositions for Examples 1 to 10 and Comparative Examples 1 to 10 shown below. The thus-obtained mixtures each was fed to a 65-mm extruder to form a 0.7 mm thick external semiconductive layer together with a 0.7 mm thick internal semiconductive layer and a 4 mm thick crosslinked polyethylene insulater on an annealed copper twisted wire conductor having a cross sectional area of 150 mm2 by extrusion coating using a common head. Then, the coated product was heated at 230° C. for crosslinking to manufacture an electric power cable insulated with a crosslinked polyethylene. The crosslinked polyethylene insulating layer was formed using a composition comprising 100 parts by weight of low density polyethylene (having a density of 0.920 g/cm³ and a melt index of 1.0 g/10 min), 2.5 parts by weight of dicumyl peroxide as the crosslinking agent and 0.25 parts by weight of 4,4'-thio-bis(3-methyl-6-tert-butylphenol). The temperature of the extruder was set in the direction from the feeding zone to the metering zone, as follows: $C_1=100°$ C., $C_2=110°$ C., $C_3=115°$ C., and the die temperature of 120° C.

EXAMPLE 1

| | |
|---|---|
| Ethylene-vinyl acetate copolymer (containing 19% of vinyl acetate; with melt index of 2.5 g/10 min) | 100 parts |
| Paraffin wax (melting point of 57.3° C.) | 5 parts |
| 4,4'-Thio-bis(3-methyl-6-tert-butylphenol) | 1 part |
| 1,3-Bis(tert-butylperoxyisopropyl)benzene | 0.5 parts |
| Furnace carbon black (with arithmetic mean particle size of 30 mμ; iodine adsorption of 53 mg/g; and DBP oil absorption of 133 ml/100 g) | 60 parts |

EXAMPLE 2

| | |
|---|---|
| Ethylene-vinyl acetate copolymer (containing 25% of vinyl acetate; with melt index of 3.0 g/10 min) | 100 parts |
| Paraffin wax (melting point of 57.3° C.) | 5 parts |
| 4,4'-Thio-bis(3-methyl-6-tert-butylphenol) | 1 part |
| 1,3-Bis(tert-butylperoxyisopropyl)benzene | 0.5 parts |
| Furnace carbon black (with arithmetic mean particle size of 30 mμ; iodine adsorption of 53 mg/g; and DBP oil absorption of 133 ml/100 g) | 60 parts |

EXAMPLE 3

| | |
|---|---|
| Ethylene-vinyl acetate copolymer (containing 28% of vinyl acetate; with melt index of 6.0 g/10 min) | 100 parts |
| Paraffin wax (melting point of 57.3° C.) | 1 part |
| 4,4'-Thio-bis(3-methyl-6-tert-butylphenol) | 1 part |
| 1,3-Bis(tert-butylperoxyisopropyl)benzene | 0.5 parts |
| Furnace carbon black (with arithmetic mean particle size of 35 mμ; iodine adsorption of 51 mg/g; and DBP oil absorption of 124 ml/100 g) | 80 parts |

EXAMPLE 4

| | |
|---|---|
| Ethylene-vinyl acetate copolymer (containing 28% of vinyl acetate; with melt index of 6.0 g/10 min) | 100 parts |
| Paraffin wax (melting point of 57.3° C.) | 10 parts |
| 4,4'-Thio-bis(3-methyl-6-tert-butylphenol) | 1 part |
| 1,3-Bis(tert-butylperoxyisopropyl)benzene | 0.5 parts |
| Furnace carbon black (with arithmetic mean particle size of 35 mμ; iodine adsorption of 51 mg/g; and DBP oil absorption of 124 ml/100 g) | 80 parts |

EXAMPLE 5

| | |
|---|---|
| Ethylene-vinyl acetate copolymer (containing 28% of vinyl acetate; with melt index of 6.0 g/10 min) | 100 parts |
| Paraffin wax (melting point of 57.3° C.) | 20 parts |
| 4,4'-Thio-bis(3-methyl-6-tert-butylphenol) | 1 part |
| 1,3-Bis(tert-butylperoxyisopropyl)benzene | 0.5 parts |
| Furnace carbon black (with arithmetic mean particle size of 35 mμ; iodine adsorption of 51 mg/g; and DBP oil absorptoon of 124 ml/100 g) | 80 parts |

EXAMPLE 6

| | |
|---|---|
| Ethylene-vinyl acetate copolymer (containing 28% of vinyl acetate; with melt index of 6.0 g/10 min) | 80 parts |
| Styrene-modified ethylene-vinyl acetate copolymer (containing 50% of styrene and 17% of vinyl acetate) | 20 parts |
| Paraffin wax (melting point of 57.3° C.) | 5 parts |
| 4,4'-Thio-bis(3-methyl-6-tert-butylphenol) | 1 part |
| 1,3-Bis(tert-butylperoxyisopropyl)benzene | 0.5 parts |
| Furnace carbon black (with arithmetic mean particle size of 35 mμ; iodine adsorption of 51 mg/g; and DBP oil absorption of 124 ml/100 g) | 80 parts |

EXAMPLE 7

| | |
|---|---|
| Ethylene-vinyl acetate copolymer (containing 28% of vinyl acetate; with melt index of 6.0 g/10 min) | 80 parts |
| Styrene-modified ethylene-vinyl acetate copolymer (containing 50% of styrene and 17% of vinyl acetate) | 20 parts |
| Paraffin wax (melting point of 57.3° C.) | 5 parts |
| 4,4'-Thio-bis(3-methyl-6-tert-butylphenol) | 1 part |
| 1,3-Bis(tert-butylperoxyisopropyl)benzene | 0.5 parts |
| Furnace carbon black (with arithmetic mean particle size of 30 mµ; iodine adsorption of 53 mg/g; and DBP oil absorption of 133 ml/100 g) | 60 parts |
| Acetylene black (with arithmetic mean particle size of 42 mµ; iodine adsorption of 70 mg/g; and DBP oil absorption of 145 ml/100 g) | 20 parts |

EXAMPLE 8

| | |
|---|---|
| Ethylene-vinyl acetate copolymer (containing 28% of vinyl acetate; with melt index of 6 g/10 min) | 60 parts |
| Styrene-modified ethylene-vinyl acetate copolymer, (containing 50% of styrene and 17% of vinyl acetate) | 40 parts |
| Paraffin wax (melting point of 57.3° C.) | 5 parts |
| 4,4'-Thio-bis(3-methyl-6-tert-butylphenol) | 1 part |
| 1,3-Bis(tert-butylperoxyisopropyl)benzene | 0.5 parts |
| Furnace carbon black (with arithmetic mean particle size of 30 mµ; iodine adsorption of 53 mg/g; and DBP oil absorption of 133 ml/100g) | 80 parts |

EXAMPLE 9

| | |
|---|---|
| Ethylene-vinyl acetate copolymer (containing 33% of vinyl acetate; with melt index of 1 g/10 min) | 100 parts |
| Microcrystalline wax (melting point 80° C.) | 10 parts |
| 4,4'-Thio-bis(3-methyl-6-tert-butylphenol) | 1 part |
| 1,3-Bis(tert-butylperoxyisopropyl)benzene | 0.5 parts |
| Furnace carbon black (with arithmetic mean particle size of 30 mµ; iodine adsorption of 53 mg/g; and DBP oil absorption of 133 ml/100 g) | 80 parts |

EXAMPLE 10

| | |
|---|---|
| Ethylene-vinyl acetate copolymer (containing 33% of vinyl acetate; with melt index of 1 g/10 min) | 80 parts |
| Styrene-modified ethylene-vinyl acetate copolymer (containing 50% of styrene and 17% of vinyl acetate) | 20 parts |
| Microcrystalline wax (melting point of 80° C.) | 10 parts |
| 4,4'-Thio-bis(3-methyl-6-tert-butylphenol) | 1 part |
| 1,3-Bis(tert-butylperoxyisopropy)benzene | 0.5 parts |
| Furnace carbon black (with arithmetic mean particle size of 30 mµ; iodine adsorption of 53 mg/g; and DBP oil absorption of 133 ml/100 g) | 80 parts |

COMPARATIVE EXAMPLE 1

| | |
|---|---|
| Ethylene-vinyl acetate copolymer (containing 60% of vinyl acetate; with melt index of 10 to 20 g/10 min) | 100 parts |
| 4,4'-Thio-bis(3-methyl-6-tert-butylphenol) | 1 parts |
| 1,3-Bis(tert-butylperoxyisopropyl)benzene | 0.5 parts |
| Acetylene black (with arithmetic mean particle size of 42 mµ; iodine adsorption of 70 mg/g; and DBP oil absorption of 145 ml/100 g) | 70 parts |

COMPARATIVE EXAMPLE 2

| | |
|---|---|
| Vinyl chloride-Ethylene-vinyl acetate terpolymer (containing 21% of vinyl acetate and 25% of vinyl chloride) | 100 parts |
| 4,4'-Thio-bis(3-methyl-6-tert-butylphenol) | 1 parts |
| 1,3-Bis(tert-butylperoxyisopropyl)benzene | 0.5 parts |
| Acetylene black (with arithmetic mean particle size of 42 mµ; iodine adsorption of 70 mg/g; and DBP oil absorption of 145 ml/100 g) | 70 parts |

COMPARATIVE EXAMPLE 3

| | |
|---|---|
| Ethylene-vinyl acetate copolymer (containing 28% of vinyl acetate; with melt index of 6 g/10 min) | 100 parts |
| Paraffin wax (melting point of 57.3° C.) | 0.7 parts |
| 4,4'-Thio-bis(3-methyl-6-tert-butylphenol) | 1 parts |
| 1,3-Bis(tert-butylperoxyisopropyl)benzene | 0.5 parts |
| Furnace carbon black (with arithmetic mean particle size of 35 mµ; iodine, adsorption of 51 mg/g; and DBP oil absorption of 124 ml/100 g) | 80 parts |

COMPARATIVE EXAMPLE 4

| | |
|---|---|
| Ethylene-vinyl acetate copolymer (containing 28% of vinyl acetate; with melt index of 6 g/10 min) | 100 parts |
| Paraffin wax (melting point of 57.3° C.) | 25 parts |
| 4,4'-Thio-bis(3-methyl-6-tert-butylphenol) | 1 parts |
| 1,3-Bis(tert-butylperoxyisopropyl)benzene | 0.5 parts |
| Furnace carbon black (with arithmetic mean particle size of 35 mµ; iodine adsorption of 51 mg/g; and DBP oil absorption of 124 ml/100 g) | 80 parts |

COMPARATIVE EXAMPLE 5

| | |
|---|---|
| Ethylene-vinyl acetate copolymer (containing 28% of vinyl acetate; with melt index of 6 g/10 min) | 80 parts |
| Styrene-modified ethylene-vinyl acetate copolymer (containing 50% of styrene and 17% of vinyl acetate) | 20 parts |
| Paraffin wax (melting point of 57.3° C.) | 5 parts |
| 4,4'-Thio-bis(3-methyl-6-tert-butylphenol) | 1 parts |
| 1,3-Bis(tert-butylperoxyisopropyl)benzene | 0.5 parts |
| Furnace carbon black (with arithmetic mean particle size of 30 mµ; iodine adsorption of 53 mg/g; and DBP oil absorption of 133 ml/100 g) | 45 parts |

COMPARATIVE EXAMPLE 6

| | |
|---|---|
| Ethylene-vinyl acetate copolymer (containing 33% of vinyl acetate; with melt index of 1 g/10 min) | 100 parts |

-continued

| | |
|---|---|
| Paraffin wax (melting point of 57.3° C.) | 5 parts |
| 4,4'-Thio-bis(3-methyl-6-tert-butylphenol) | 1 parts |
| 1,3-Bis(tert-butylperoxyisopropyl)benzene | 0.5 parts |
| Furnace carbon black (with arithmetic mean particle size of 22 mµ; iodine adsorption of 104 mg/g; and DBP oil absorption of 129 ml/100 g) | 80 parts |

COMPARATIVE EXAMPLE 7

| | |
|---|---|
| Ethylene-vinyl acetate copolymer (containing 33% of vinyl acetate; with melt index of 1 g/10 min) | 100 parts |
| Paraffin wax (melting point of 57.3° C.) | 5 parts |
| 4,4'-Thio-bis(3-methyl-6-tert-butylphenol) | 1 parts |
| 1,3-Bis(tert-butylperoxyisopropyl)benzene | 0.5 parts |
| Furnace carbon black (with arithmetic mean particle size of 29 mµ; iodine adsorption of 70 mg/g; and DBP oil absorption of 127 ml/100 g) | 80 parts |

COMPARATIVE EXAMPLE 8

| | |
|---|---|
| Ethylene-vinyl acetate copolymer (containing 33% of vinyl acetate; with melt index of 1 g/10 min) | 100 parts |
| Paraffin wax (melting point of 57.3° C.) | 5 parts |
| 4,4'-Thio-bis(3-methyl-6-tert-butylphenol) | 1 parts |
| 1,3-Bis(tert-butylperoxyisopropyl)benzene | 0.5 parts |
| Furnace carbon black (with arithmetic mean particle size of 34 mµ; iodine adsorption of 51 mg/g; and DBP oil absorption of 103 ml/100 g) | 80 parts |

COMPARATIVE EXAMPLE 9

| | |
|---|---|
| Ethylene-vinyl acetate copolymer (containing 33% of vinyl acetate; with melt index of 1 g/10 min) | 80 parts |
| Styrene-modified ethylene-vinyl acetate copolymer (containing 50% of styrene and 17% of vinyl acetate) | 20 parts |
| Paraffin wax (melting point of 57.3° C.) | 5 parts |
| 4,4'-Thio-bis(3-methyl-6-tert-butylphenol) | 1 parts |
| 1,3-Bis(tert-butylperoxyisopropyl)benzene | 0.5 parts |
| Furnace carbon black (with arithmetic mean particle size of 30 mµ; iodine adsorption of 220 mg/g; and DBP oil absorption of 178 ml/100 g) | 80 parts |

COMPARATIVE EXAMPLE 10

| | |
|---|---|
| Ethylene-vinyl acetate copolymer (containing 33% of vinyl acetate; with melt index of 1 g/10 min) | 80 parts |
| Styrene-modified ethylene-vinyl acetate copolymer (containing 50% of styrene and 17% of vinyl acetate) | 20 parts |
| Paraffin wax (melting point of 57.3° C.) | 5 parts |
| 4,4'-Thio-bis(3-methyl-6-tert-butylphenol) | 1 parts |
| 1,3-Bis(tert-butylperoxyisopropyl)benzene | 0.5 parts |
| Furnace carbon black (with arithmetic mean particle size of 43 mµ; iodine adsorption of 44 mg/g; and DBP oil absorption of 115 ml/100 g) | 80 parts |

The compositions given above and the cables prepared using thereof were evaluated and the results are given in Table 1.

Evaluation were made according to the following.

Peel strength: Force necessary to peel the outer semiconductive layer off the cable was measured at room temperature according to the AEIC-CS5-82 standard Volume resistivity: Measured according to the AEIC-CS5-82 standard.

Tensile strength: The semiconductive layer peeled off the cable was measured following the JIS C-3005 standard. Those having the tensile strength of 1.0 kg/mm$^2$ or more were evaluated 'good' and those lower than 1.0 kg/mm$^2$ were evaluated 'poor'.

Heat aging resistance: The semiconductive layer peeled off the cable was aged in a gear-oven aging tester at 135° C. for 7 days according to the IEC standardized method. Those maintaining both tensile strength and elongation in the range from 75% to 125% of the initial values were evaluated 'good' and those showing values out of the above were evaluated 'poor'.

Mooney viscosity ($ML_{1+4}$): Evaluations were made on semiconductive compositions at 120° C. Those having values of 50 or less had good extrusion workability.

TABLE 1

| Example | Peel Strength (kg/½ inch) | Volume Resistivity (Ω · cm) | Tensile Strength | Heat Aging Resistance | Mooney Viscosity |
|---|---|---|---|---|---|
| Example 1 | 7.5 | 3 × 10$^3$ | good | good | 48 |
| Example 2 | 4.9 | 4 × 10$^3$ | good | good | 49 |
| Example 3 | 4.2 | 4 × 10$^1$ | good | good | 47 |
| Example 4 | 3.6 | 7 × 10$^1$ | good | good | 38 |
| Example 5 | 2.9 | 2 × 10$^2$ | good | good | 28 |
| Example 6 | 2.0 | 2 × 10$^1$ | good | good | 45 |
| Example 7 | 3.9 | 8 × 10$^0$ | good | good | 50 |
| Example 8 | 1.3 | 2 × 10$^0$ | good | good | 47 |
| Example 9 | 2.2 | 5 × 10$^2$ | good | good | 40 |
| Example 10 | 1.8 | 7 × 10$^1$ | good | good | 42 |
| Com. Example 1 | 1.3 | 6 × 10$^1$ | poor | poor | 75 |
| Com. Example 2 | 1.5 | 2 × 10$^1$ | poor | poor | 73 |
| Com. Example 3 | 6.9 | 2 × 10$^1$ | good | good | 52 |
| Com. Example 4 | 2.5 | 4 × 10$^2$ | good | poor | 24 |
| Com. Example 5 | 4.3 | 7 × 10$^7$ | good | good | 57 |
| Com. Example 6 | 2.5 | 5 × 10$^4$ | good | good | 66 |
| Com. Example 7 | 2.8 | 3 × 10$^4$ | good | good | 50 |
| Com. Example 8 | 3.3 | 7 × 10$^4$ | good | good | 32 |
| Com. Example 9 | 4.7 | 4 × 10$^0$ | good | good | 62 |
| Com. Example 10 | 2.8 | 1 × 10$^5$ | good | good | 28 |

The samples of Example 1 to 10 of the present invention on the whole had good peeling strength, volume resistivity, mechanical strength, thermal resistance, and viscosity for the composition, except for the sample using an ethylene-vinyl acetate copolymer containing 19% by weight of vinyl acetate which showed a somewhat increased peeling strength.

Comparative Examples 1 and 2 used an ethylenevinyl acetate copolymer containing 60% by weight of vinyl acetate and a vinyl chloride-ethylene-vinyl acetate terpolymer, respectively. In these cases, both mechanical strength and thermal resistance are insufficient Moreover, Mooney viscosity was so high that extrusion workability was deteriorated. Comparative Example 3 used less paraffin wax than the limit defined in the present invention. In such a case, peeling strength was increased and also the extrusion workability is somewhat damaged. Comparative Example 4, on the contrary, used more paraffin wax than the limit of the invention. In this case, the heat aging resistance is insufficient. Comparative Example 5 used furnace carbon black in an amount less than the limit of the present invention that the volume resistivity is too increased. Comparative Examples from 6 to 10 used furnace carbon black in an amount out of the content range limited in the present invention that volume resistivity or extrusion workability was deteriorated despite the good peeling property While the invention has been described in detail and with reference to specific embodiments thereof, it will be apparent to one skilled in the art that various changes and modifications can be made therein without departing from the spirit and scope thereof.

What is claimed is:

1. An easily peelable semiconductive resin composition comprising 100 parts by weight of ethylene-vinyl acetate copolymer-based polymer component, 1 to 20 parts by weight of waxy aliphatic hydrocarbon, and 50 parts by weight or more of furnace carbon black having an arithmetic mean particle size of 25 to 40 mµ, iodine adsorption of 40 to 60 mg/g, and DBP oil absorption (by JIS A method) of 120 to 150 ml/100 g.

2. An easily peelable semiconductive resin composition as in claim 1, wherein the polymer component comprises only ethylene-vinyl acetate copolymer.

3. An easily peelable semiconductive resin composition as in claim 2, wherein the ethylene-vinyl acetate copolymer contains 20 to 55% by weight of vinyl acetate.

4. An easily peelable semiconductive resin composition as in claim 1, wherein the polymer component is a blend of ethylene-vinyl acetate copolymer (I) and aromatic vinyl monomer-modified ethylene-vinyl acetate copolymer obtained by graft-copolymerization of aromatic vinyl monomer to ethylene-vinyl acetate copolymer (II).

5. An easily peelable semiconductive resin composition as in claim 4, wherein the ethylene-vinyl acetate copolymer (I) contains 20 to 55% by weight of vinyl acetate.

6. An easily peelable semiconductive resin composition as in claim 4, wherein the ethylene-vinyl acetate copolymer (II) contains 20% by weight or more of vinyl acetate.

7. An easily peelable semicondutive resin composition as in claim 4, wherein the aromatic vinyl monomer-modified ethylene-vinyl acetate copolymer contains 5 to 60% by weight of aromatic vinyl monomer.

8. An easily peelable semiconductive resin composition as in claim 4, wherein the polymer component contains 95 to 50% by weight of ethylene-vinyl acetate copolymer (I) and 5 to 50% by weight of aromatic vinyl monomermodified ethylene-vinyl acetate copolymer.

9. An easily peelable semiconductive resin composition as in claim 4, wherein the aromatic vinyl monomer is styrene.

10. An easily peelable semiconductive resin composition as claimed in claim 1, wherein the waxy hydrocarbon is paraffin wax.

11. An easily peelable semiconductive resin composition as in claim 1, wherein the waxy hydrocarbon is microcrystalline wax.

12. An easily peelable semiconductive resin composition as claimed in claim 1, wherein the composition further comprises an antioxidant.

13. An easily peelable semiconductive resin composition as in claim 12, wherein the antioxidant is 4,4'-thiobis(3-methyl-6-t-butyl-phenol).

14. An easily peelable semiconductive resin composition as in claim 1, wherein the composition further comprises a crosslinking agent.

15. An easily peelable semiconductive resin composition as in claim 14, wherein the crosslinking agent is 1,3-bis(tert-butylperoxyisopropyl)benzene.

16. An easily peelable semiconductive resin composition as in claim 1, wherein the composition further comprises an acetylene black in an amount such that the Mooney viscosity of the resulting composition is 50 or less.

* * * * *